P. C. BAKER.
IRRIGATING DAM.
APPLICATION FILED OCT. 9, 1912.
1,080,944.
Patented Dec. 9, 1913.
3 SHEETS—SHEET 1.
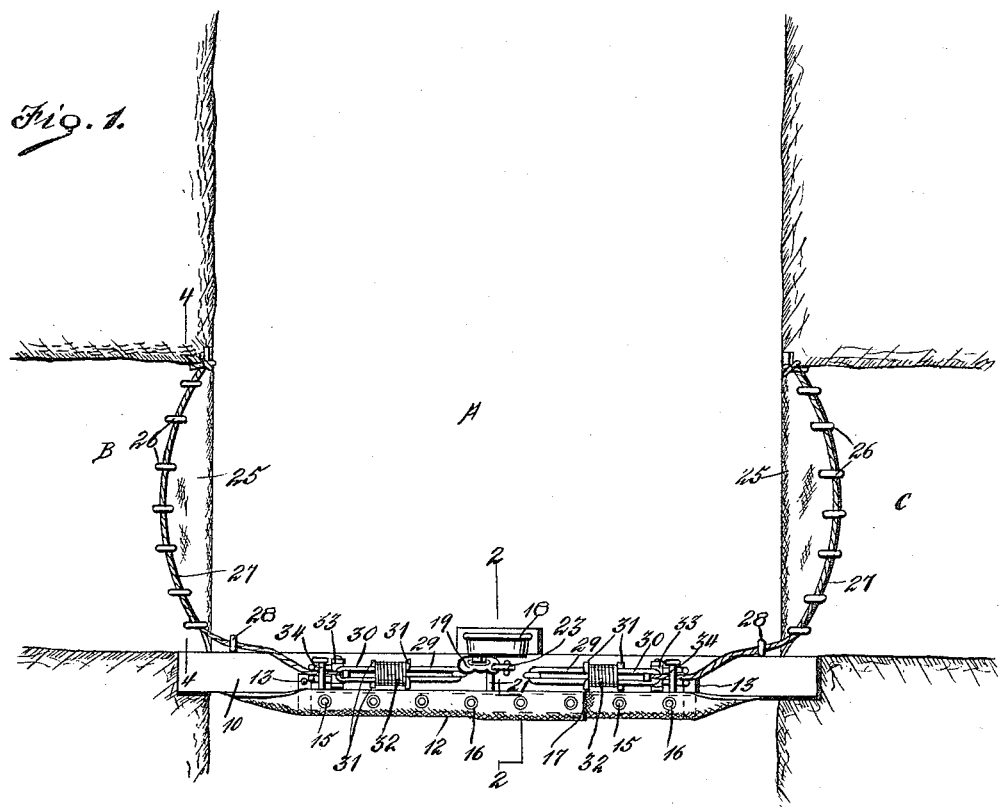
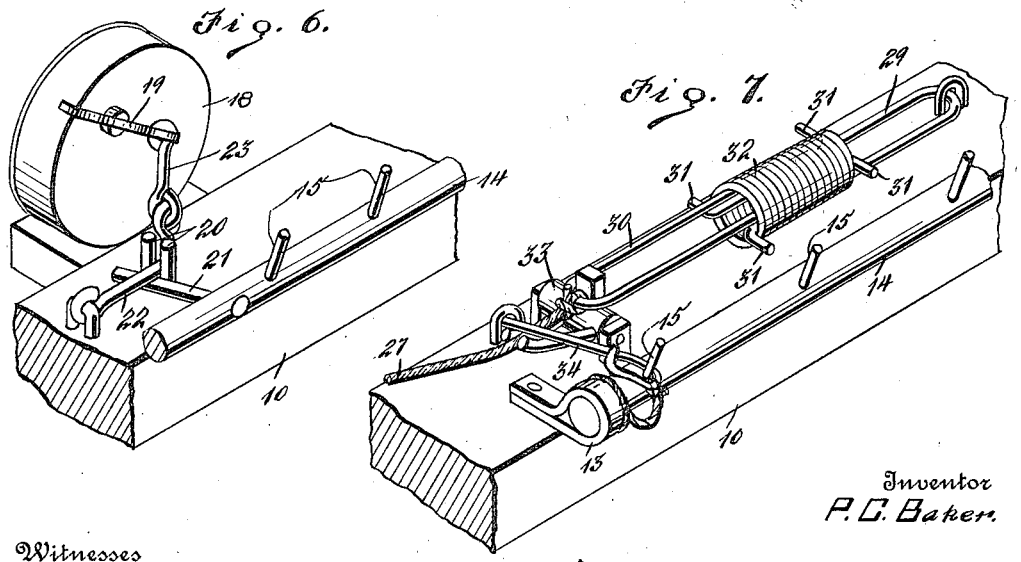
Witnesses
Inventor
P. C. Baker.
By 
Attorneys

P. C. BAKER.
IRRIGATING DAM.
APPLICATION FILED OCT. 9, 1912.

1,080,944.

Patented Dec. 9, 1913.

3 SHEETS—SHEET 2.

Witnesses

Inventor
P. C. Baker

By
Attorneys

P. C. BAKER.
IRRIGATING DAM.
APPLICATION FILED OCT. 9, 1912.
1,080,944.
Patented Dec. 9, 1913.
3 SHEETS—SHEET 3.
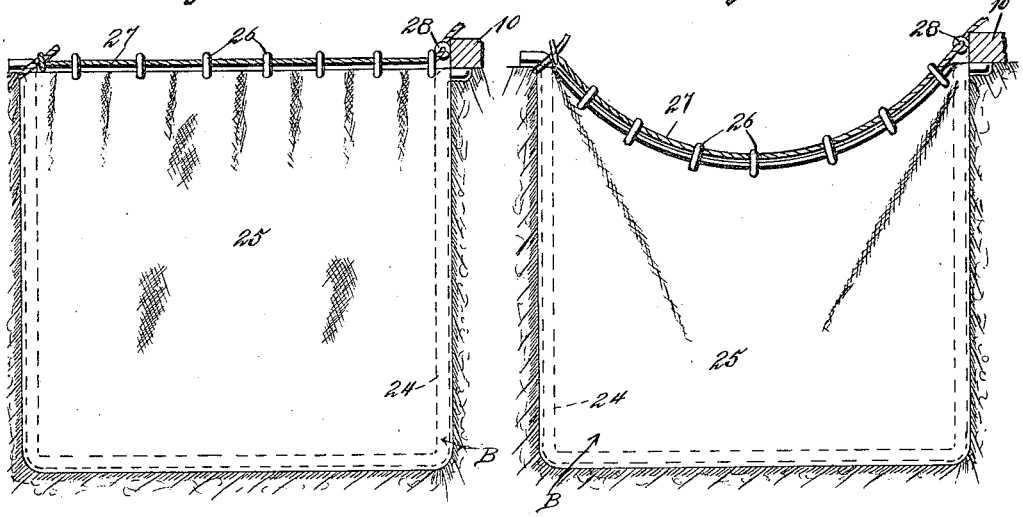
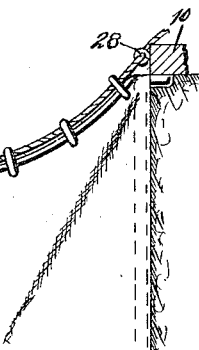
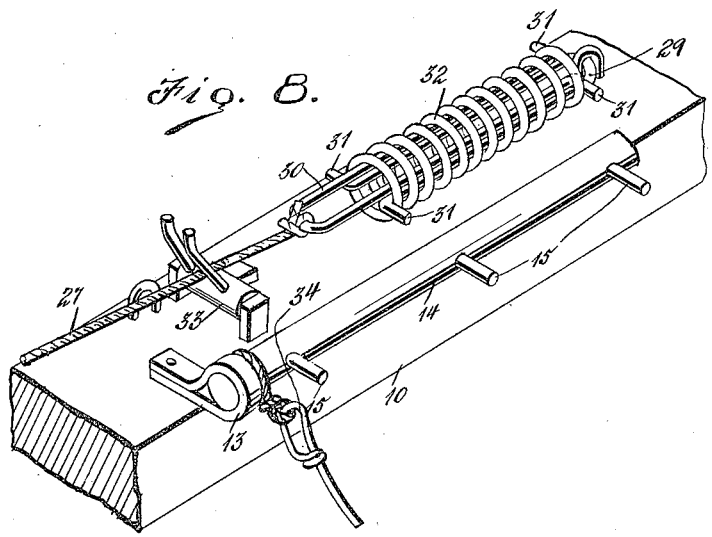

UNITED STATES PATENT OFFICE.

PORTER C. BAKER, OF MORRILL, NEBRASKA, ASSIGNOR OF ONE-THIRD TO VALENTINE THOMAS, OF MORRILL, NEBRASKA.

IRRIGATING-DAM.

1,080,944.   Specification of Letters Patent.   Patented Dec. 9, 1913.

Application filed October 9, 1912.   Serial No. 724,823.

*To all whom it may concern:*

Be it known that I, PORTER C. BAKER, a citizen of the United States, residing at Morrill, in the county of Scotts Bluff, State of Nebraska, have invented certain new and useful Improvements in Irrigating-Dams; and I do hereby declare the following to be a full, clear, and exact description of the invention, such as will enable others skilled in the art to which it appertains to make and use the same.

This invention relates to dams and particularly that type utilized for controlling the flow of water through irrigating ditches.

The object of the invention resides in the provision of a dam of the type named which is adapted to close the flow of water through an irrigating ditch and which includes means for automatically opening the dam at the expiration of a predetermined time so as to permit the flow of water through the ditch beyond the dam to a desired point.

A further object of the invention resides in the provision of a dam adapted to be located forward of a lateral discharge of an irrigating ditch so as to arrest the flow of water through the main irrigating ditch and thereby force same through the lateral discharge and which further includes means operated by the opening of the dam with respect to the main irrigating ditch for closing communication between the main irrigating ditch and the adjacent lateral discharge so that the full supply of water will pass through the irrigating ditch beyond the dam to a desired lateral discharge on the down-stream side the one automatically closed.

With the above and other objects in view, the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 2:
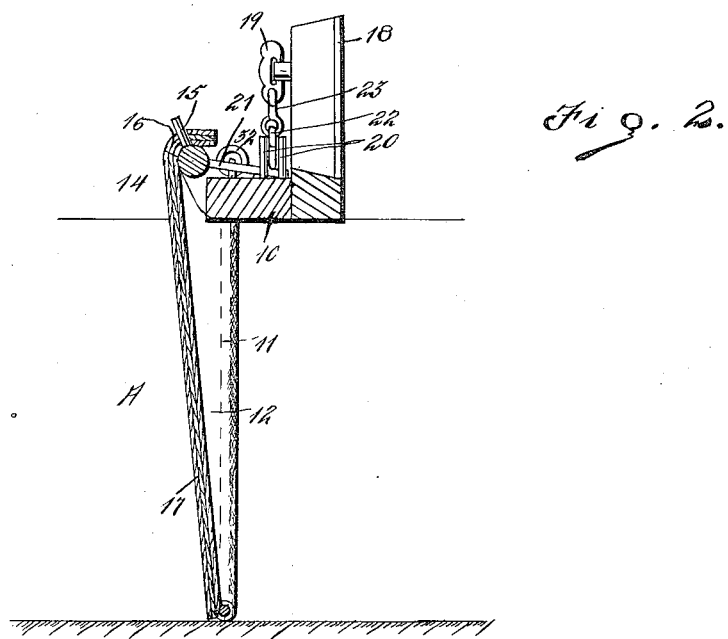
Figure 3:
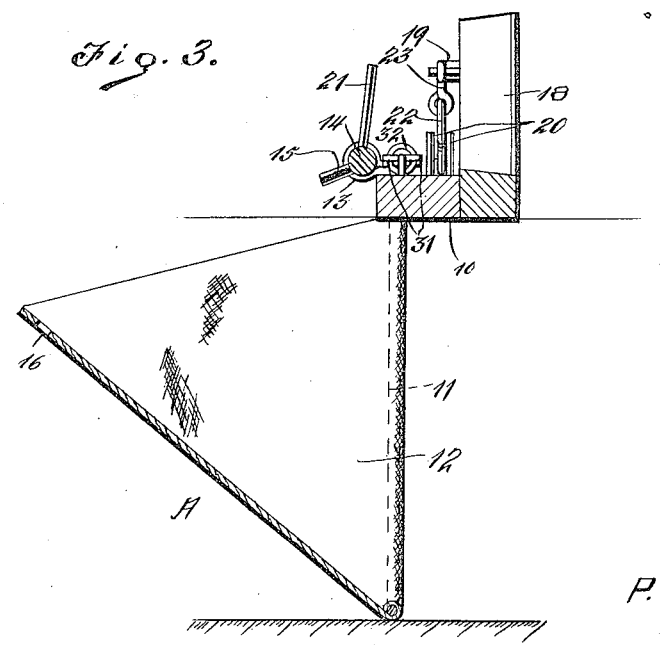

Figure 1 is a plan view of an irrigating ditch and a pair of lateral discharges leading therefrom and showing the improved dam applied and in closed position with respect to the main irrigating ditch, the water being free to flow through the lateral discharges. Fig. 2 a section on the line 2—2 of Fig. 1. Fig. 3 a view similar to Fig. 2 with the dam in open position with respect to the main irrigating ditch. Fig. 4 a section on the line 4—4 of Fig. 1. Fig. 5 a view similar to Fig. 4 showing the position of the parts of the dam wing when the main irrigating ditch is closed by the dam. Fig. 6 a detail perspective view of the clock mechanism which controls the opening of the main dam at a predetermined time, the parts of said mechanism being shown in the position they would occupy when holding the dam closed. Fig. 7 a detail perspective view of the mechanism which is automatically operated by the opening of the main dam to close the wing which controls the lateral discharge, and Fig. 8 a view similar to Fig. 7 with the parts in the position they would occupy when the main dam has been opened.

Referring to the drawings A indicates a main irrigating ditch and B and C lateral discharge ditches leading from said main irrigating ditch. The dam for controlling the flow of water through the main irrigating ditch A is shown as comprising a beam 10 which spans the ditch A on the downstream side of the lateral discharge ditches B and C. This beam 10 supports an anchor frame 11 corresponding in shape to the interior transverse shape of the ditch A and said frame extends into the ditch in such manner as to hold a fabric sheet 12 across the ditch for the purpose of closing the flow of water through said ditch. This fabric 12 may be of any suitable material and is constructed with a central fullness so that same may be lapped and secured for positively stopping the flow of water. Mounted upon the beam 10 at spaced points are journal bearings 13 in which is rotatably mounted a rod 14 provided with a plurality of lateral pins 15 disposed in the same plane and adapted to engage eyes 16 formed in the upper edge of the fabric 12 whereby said fabric may be secured in position to positively and efficiently stop the flow of water through the ditch A. When the fabric is thus secured the central portion thereof is lapped as at 17 so as to take up the fullness of the fabric and render same taut throughout.

Mounted upon the beam 10 centrally of the latter is a clock mechanism 18 of the alarm type and which includes an alarm winding key 19. Mounted upon the beam 10 beneath the clock mechanism is a pair of spaced vertical pins 20 and carried by the rod 14 is a trigger pin 21 which when the rod 14 is rotated in one direction is adapted to engage the upper side of the beam 10 adjacent the pin 20. Pivotally mounted upon the upper side of the beam 10 is a sear 22 which is adapted to move between the pins 20 and confine the trigger pin 21 beneath same and against the upper side of the beam 10. The sear 22 is connected to one end of the alarm key 19 of the clock mechanism by means of a link 23. By this construction it will be apparent that when the alarm of the clock mechanism is wound and set the sear 22 will be held between the pins 20 so as to secure the trigger pin 21 against movement and the rod 14 thereby locked against rotation. When the rod 14 is thus locked against rotation the pins 15 extend vertically and are engaged in the eyes 16 of the fabric 12 so as to hold the latter in position to stop the flow of water through the ditch A. With the fabric 12 thus secured it will be apparent that when the alarm of the clock mechanism 18 is set off at a predetermined time the key 19 will rotate so as to lift the sear 22 and release the trigger pin 21. The pressure of the water in the ditch A will then rotate the rod 14 until the pins 15 lie substantially horizontal. When the pins 15 have assumed a horizontal position the pressure of the water against the fabric 12 will disengage the upper edge of said fabric from said pins 15 and unfold the lap 17 which will cause the upper edge of the fabric to fall downwardly at the center and permit the passage of water over the fabric.

The dam further includes wings for controlling the passage of water through the lateral discharge ditches B and C and as both of these wings are identical only that controlling the flow of water through the lateral discharge ditch B will be described in detail. Secured to the beam 10 and disposed at right angles thereto is a U-shaped frame 24 which extends across the ditch B, said frame conforming substantially to the transverse shape of said ditch. Mounted in the frame 24 is a fabric 25 of any suitable material, the upper edge of which is provided with a plurality of eyes 26. Secured to the end of the frame 24 remote from the beam 10 is one end of a cable 27, said cable passing through the eyes 26 and through an eye 28 secured to the beam 10 for a purpose that will presently appear. Mounted on the upper side of the beam 10 are inner and outer U-shaped members 29 and 30 respectively, the inner U-shaped member being anchored to the beam 10 and the outer U-shaped member being free to slide longitudinally under normal condition. These U-shaped members are arranged in opposition and have the terminals of their arms bent outwardly as at 31. Encircling the U-shaped members 29 and 30 between the outwardly bent terminals 31 is a spring 32 which constantly tends to draw the outer U-shaped member 30 inwardly of the beam 10. Pivotally mounted upon the upper side of the beam 10 is an angle member 33 one arm of which is adapted to engage within the outer U-shaped member 30, while the other arm thereof is adapted to be engaged by a pin 34 carried by the rod 14 when said rod has been rotated to a position to dispose the pins 15 vertically, said pin 34 in this position of the rod 14 overlying the arm of the angle member 33 and locking said member against rotation on its pivot so as to hold the outer U-shaped member 30 against movement inwardly of the beam 10 under the influence of the spring 32. The cable 27 is secured at its other end to the outer end of the U-shaped member 30.

In the operation of the wing of the dam it will be apparent that when the fabric 12 is in closed position the cable 27 will be slack so that water can flow through the lateral ditch B over the upper edge of the fabric 25. However as soon as the fabric 12 has been released from engagement with the pins 15 by the rotation of the rod 14 the pin 34 will be moved so as to release the angle member 33 when the U-shaped member 30 will be drawn inwardly of the beam 10 by the spring 33 and the cable 27 pulled taut so as to raise the upper edge of the fabric 25 and stop the flow of water through the lateral ditch B.

What I claim is:—

1. The combination with an irrigating canal, of a dam for controlling the flow of water therethrough, said dam including a beam spanning the canal, a fabric gate supported by said beam, said gate having a greater width than the canal, means for securing the gate in a folded state to close the canal, and means for releasing the upper edge of the gate and the folds thereof whereby said upper edge will move downwardly and permit the flow of water through the canal.

2. The combination with an irrigating canal, of a dam for controlling the flow of water therethrough, said dam including a beam spanning the canal, a fabric gate having the outer ends of its upper edge anchored to the beam, means for detachably supporting the intermediate portions of the upper edge of the gate from the beam, and means for disengaging the intermediate portion of the upper edge of the gate from its supporting means whereby said intermediate portion of the upper edge will move downwardly and permit the flow of water through the canal.

3. The combination with an irrigating canal, of a dam for controlling the flow of water therethrough, said dam including a beam spanning the canal, a fabric gate having the outer ends of its upper edge anchored to the beam, and the intermediate portion of its upper edge provided with a plurality of openings, a shaft rotatably mounted on the beam, a plurality of radially disposed fingers carried by the shaft and adapted to be engaged through the openings in the gate to support the upper edge of the latter at a predetermined elevation, means for locking the shaft against rotation and in position to support the upper edge of the gate through the medium of said fingers, and means for releasing the shaft for rotation to a position to effect the disengagement of the gate from said fingers.

4. The combination with a main irrigating canal and a lateral discharge canal leading therefrom, of a dam controlling the flow of water through the main canal, a dam for controlling the flow of water through the lateral discharge canal, said last named dam including a fabric gate having its upper edge supported by a flexible cable spanning the lateral discharge canal, means for holding said cable slack when the main canal dam is closed, and means operated by the opening of the main canal dam for drawing said cable taut.

In testimony whereof, I affix my signature, in the presence of two witnesses.

PORTER C. BAKER.

Witnesses:
O. W. ASA,
D. N. PLUMMER.

Copies of this patent may be obtained for five cents each, by addressing the "Commissioner of Patents, Washington, D. C."